March 7, 1939.    O. KYLIN    2,149,940
BRAKE AND CONTROL THEREFOR
Filed May 4, 1937
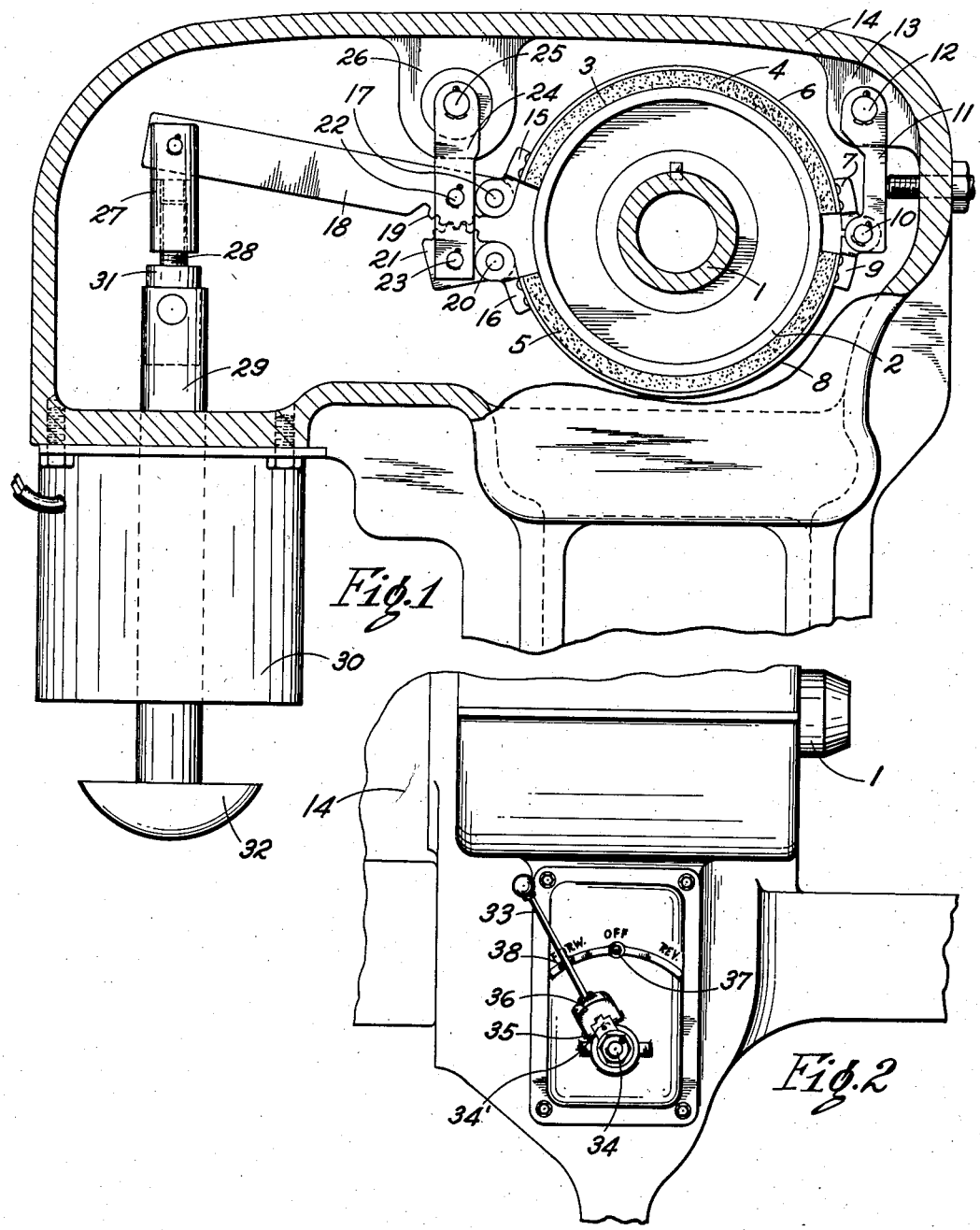
INVENTOR.
OSKAR KYLIN
BY
ATTORNEYS Patented Mar. 7, 1939

2,149,940

UNITED STATES PATENT OFFICE 2,149,940

BRAKE AND CONTROL THEREFOR

Oskar Kylin, Cleveland Heights, Ohio, assignor to Bardons & Oliver, Inc., Cleveland, Ohio, a corporation of Ohio Application May 4, 1937, Serial No. 140,745

2 Claims. (Cl. 192—2)

This invention relates to brakes and more particularly to an improved quick acting, easily operated brake for the revolving spindles of machine tools such as turret lathes or the like.

In the operation of lathes and other machine tools which have rotating spindles, present day high-speed production requirements have made it important to be able to stop the rotating spindle of the machine promptly and to eliminate the necessity of waiting for the spindle to stop coasting after the power has been shut off or the driving connection released.

It is among the objects of the present invention to provide a simple, rugged and effective brake for the spindles of machine tools and to provide a simple and effective control means for the brake.

It will be understood that my improved brake and control device may be applied to any desired type of rotating shaft or spindle, regardless of its use, but in this specification and in the appended drawing, my invention is described and illustrated as applied to the rotating hollow spindle of a turret lathe.

In the drawing—

Figure 1 is a fragmentary vertical cross-section through the rotating hollow spindle of a lathe or the like.

Figure 2 is a fragmentary side elevation of a portion of a lathe showing the spindle and the control lever for controlling the starting, stopping and braking of the spindle.

Referring particularly to Figure 1, the hollow lathe spindle 1 may be supported in suitable bearings and connected to be driven in any suitable manner. The illustrated section is taken through the brake mechanism which may be disposed at any convenient point along the spindle. A brake drum 2 is keyed to the rotating spindle and rotates therewith. This drum is provided with a cylindrical braking face 3 which is adapted to be engaged by the brake shoes 4 and 5 of suitable brake lining material. The brake shoe 4 is supported on the backing member 6 which is secured at one end to the bracket 7 and the lining member 5 is secured to the backing member 8 which is similiarly secured at one end to the bracket 9. The bracket members 7 and 9 are pivotally supported on the pin 10 which is carried by the downwardly extending arm 11 which in turn is pivotally supported on the pin 12 carried by the portion 13 of the housing 14 of the machine which forms a fixed support for the floating arm 11.

The opposite end of the backing member 6 from the bracket 7 is secured to an apertured end member 15 and the corresponding end of the backing member 8 is attached to a similar end member 16. Pivotally secured to end piece 15 at 17 is the operating arm 18 which carries the gear segment 19. Similarly pivoted to the end piece 16 at 20 is a gear segment 21. The gear segments 19 and 21 are held in engagement and pivotally supported by the pins 22 and 23, respectively, which are carried by the down-extending floating supporting bar 24 which has a pivoted support on the pin 25. A lug 26 on the housing 14 provides a fixed support for the pin 25. The outer end of the lever 18 is pivoted to the adjustable head member 27 which has threaded engagement with the screw 28 which in turn is adjustably supported in the operating plunger 29 of the solenoid 30. A lock nut 31 permits adjustment of the lever arm 18 and provides a simple and effective means for adjusting the brake action and taking up wear of the brake shoes. The plunger 29 of the solenoid 30 extends through the body of the solenoid and may carry a weight 32 at the lower end thereof.

The solenoid 30 is so arranged and connected that when it is energized from a suitable source of electric current (not shown) the plunger 29 is moved upwardly. This moves the outer end of the lever 18 upwardly and rotates it about its pivot 22 on the bar 24. This rotation of the gear segment 19 causes a corresponding movement of the gear segment 21 and the bracket 16 will be moved toward the bracket 15, the brake shoes 4 and 5 being drawn into engagement with the face 3 of the brake drum 2. The floating support of the ends of the brake shoes which are attached to the brackets 7 and 9, provided by the arm 11 and the floating support 24 for the operating gears 19 and 21, permits of a very smooth and even braking engagement of the brake shoes 4 and 5 with the drum 2. The long lever arm 18 affords the desired mechanical advantage so that a relatively small solenoid may be utilized to obtain the desired braking effect. By use of the gear segments 19 and 21 both brake shoes 4 and 5 are caused simultaneously and positively to engage the brake drum and the pivoted supports of the bar 24 and the arm 11 on the fixed machine housing furnishes a floating mounting for the brake shoes whereby they may accurately center themselves with and conform to the surface of the brake drum 2.

In Figure 2 a simple and effective control arrangement for my improved electric brake is illustrated. The lever 33 is connected to a stub lever 34' on the main control shaft 34 of the machine by a pin 35. This connection of the lower end 36 of the lever 33 permits a limited movement of the lever 33 toward and away from the machine. A push button switch 37 is mounted at the central or off position of the control lever 33.

As illustrated, the lever has been moved into position for forward rotation of the machine spindle. When the operator desires to stop the machine he merely moves the lever 33 to the right until it is in its central or "off" position. The boss 38 on the lever 33 will now be aligned with the push button 37 and the operator, by a slight inward pushing of the lever 33, can operate the push button switch to energize the solenoid 30 thus actuating the brake and immediately stopping the rotation of the spindle. Preferably spring means (not shown) are provided to return the lever 33 to normal position and release the brake.

When reverse rotation of the spindle is desired the lever 33 is moved to its right hand position. The brake can be actuated at any time when the lever 33 is in its intermediate or off position but only when in this position. By combining the braking operation with the forward and reverse control lever the operator can control the spindle brake and also the forward or reverse rotation of the spindle without removing his hand from the single control.

Although I have illustrated and described in considerable detail the particular embodiment of my invention shown in the accompanying drawing, it will be understood by those skilled in the art that my control system and brake are adapted for varied uses and may be modified in the details of their structural arrangement without departing from the spirit of my invention. I do not therefore wish to be limited to the specific embodiment herein shown and described, but claim as my invention all forms thereof coming within the scope of the appended claims.

I claim:

1. In combination in a machine tool, an electrically operated spindle brake, a control shaft adapted to control the rotation of said spindle and having on and off positions, a control lever, means for connecting said lever to said shaft, means for permitting movement of said lever in a direction axially of said shaft, switch means for controlling said electric brake, and an operating button for said switch disposed at the off position of said lever whereby movement of said lever axially of said shaft when in the off position may move said button and operate said switch.

2. In apparatus of the type described, a rotatable shaft, an electrically operated brake for said shaft, a control lever, means actuated by said control lever for controlling the rotation of said shaft, said lever having on and off positions in which said shaft is respectively driven and not driven and being movable to and from said on and off positions, means for permitting said lever to move in another direction when in said off position, switch means for controlling said electric brake, and means for operating said switch positioned to be engaged and actuated by said lever when said lever is disposed at said off position and is moved in said other direction.

OSKAR KYLIN.